(12) United States Patent
Karl

(10) Patent No.: US 6,272,839 B1
(45) Date of Patent: Aug. 14, 2001

(54) HYDRAULIC AIR COMPRESSOR AND BIOLOGICAL REACTOR SYSTEM AND METHOD

(76) Inventor: Lorne Karl, Box 49, Langdon, Alberta (CA)

( * ) Notice: Subject to any disclaimer, the term of this patent is extended or adjusted under 35 U.S.C. 154(b) by 0 days.

(21) Appl. No.: 09/312,906

(22) Filed: May 17, 1999

(51) Int. Cl.[7] .................................................... F02G 3/00
(52) U.S. Cl. ................................................... 60/39.02
(58) Field of Search .............................. 60/39.02, 726, 60/728; 417/150

(56) References Cited

U.S. PATENT DOCUMENTS

| | | |
|---|---|---|
| 1,000,345 | 8/1911 | Roed . |
| 2,013,236 | 9/1935 | Dell . |
| 2,861,737 | 11/1958 | Bowen . |
| 4,278,405 | 7/1981 | Angle . |
| 4,307,299 | * 12/1981 | Norton .................................. 290/52 |
| 4,462,205 | 7/1984 | Giles . |
| 5,099,648 | * 3/1992 | Angle ..................................... 60/726 |
| 5,353,585 | * 10/1994 | Munk ................................. 60/39.05 |
| 5,364,529 | * 11/1994 | Morin et al. ......................... 210/608 |

* cited by examiner

*Primary Examiner*—Timothy S. Thorpe
*Assistant Examiner*—William Rodriguez
(74) *Attorney, Agent, or Firm*—Philip J. Anderson; Anderson, Morishita, LLC

(57) ABSTRACT

A hydraulic air compressor (HAC) and system and method are set forth for aerobic treatment of waste effluent and for generation of power. The waste liquid is supplied to an upper end of a down shaft for the HAC which includes injection of air into the liquid for compression and for aerobic treatment of the liquid. The liquid falls to a separator where compressed air is liberated from the liquid. The liquid is returned to, for example, a sludge pond for recirculation and treatment. The compressed air is supplied as combustion air to a power generation unit such as a gas turbine for generation of electricity.

14 Claims, 8 Drawing Sheets

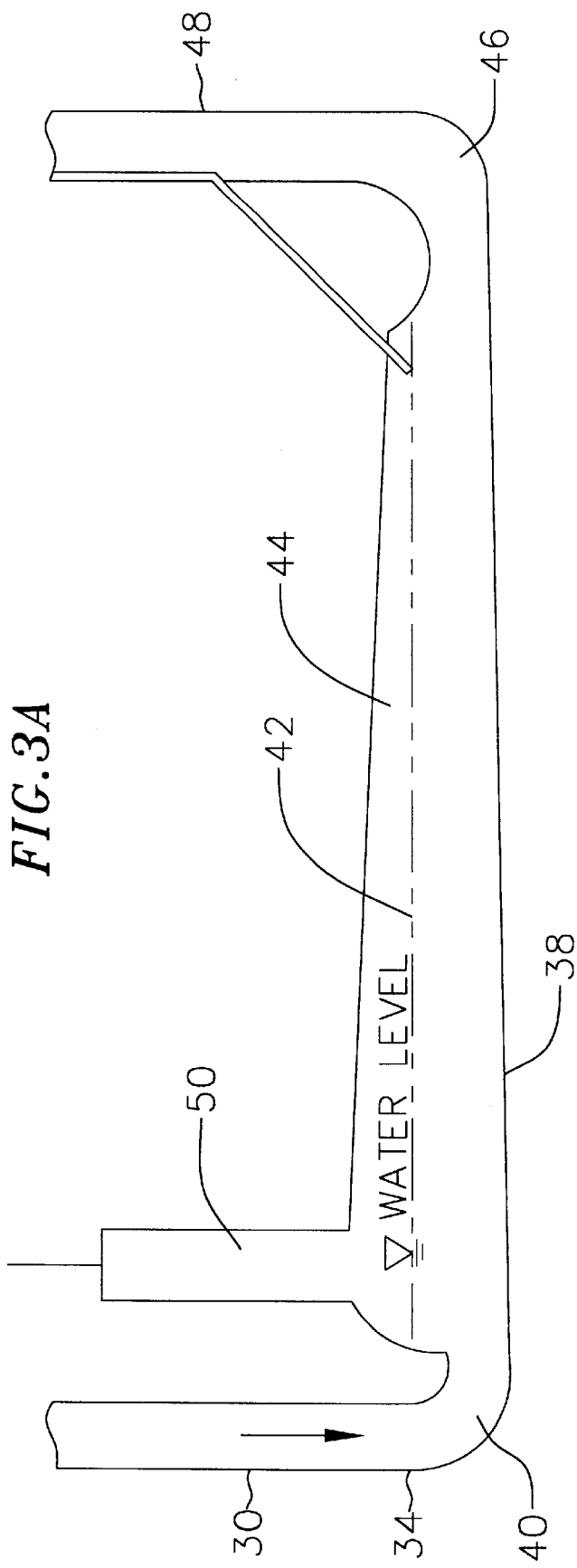
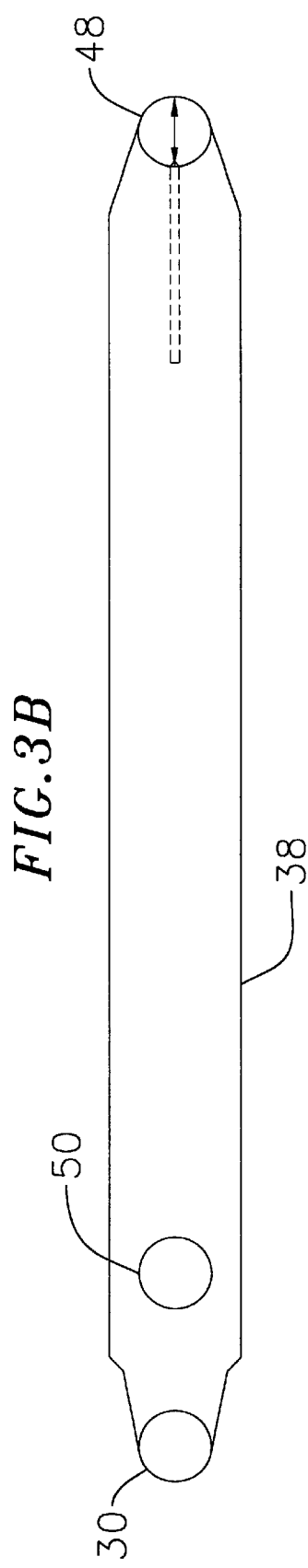

HYDRAULIC AIR COMPRESSOR AND BIOLOGICAL REACTOR SYSTEM AND METHOD

FIELD OF THE INVENTION

The present invention relates to hydraulic air compressors, systems employing hydraulic air compressors and systems and methods for aerobic, biological treatment of waste water.

BACKGROUND

Compression of air using an hydraulic air compressor (HAC) is generally known. In Richardson, U.S. Pat. No. 4,797,563, the disclosure of which is hereby incorporated by reference, discloses a HAC to compress air which is provided to the burners of a turbine to generate electrical power. According to this reference, air is drawn into the down shaft through open pipes into the flowing water to be compressed. The compressed air and water emerge from the shaft at a tunnel where the compressed air liberates from the water and is conducted to a turbine. Richardson does not show any means to forcible entrain air or for efficiently entraining air into the flowing liquid for compression thereof.

In Angle, U.S. Pat. No. 5,099,648, a HAC is also disclosed which, similarly to Richardson '563 does not provide any means to forcibly entrain air into the liquid for compression thereof.

Accordingly, a drawback of the type of systems discussed above is that the volume of air for compression relies upon a configuration to naturally draw air into the liquid flow as the volume of air to be compressed. Means are not disclosed to increase the volume of air to be compressed to provide for more versatility and efficiency in a HAC or system incorporated the same. Still further, these systems provide no convenient means to control either or both of the flow of liquid through the HAC or the volume of compressed air produced. It would be desirable to provide means to control the flow of liquid and the volume of air produced by the HAC.

Still further, these prior HACs are subject to slug flow in their down shafts which can result in blowback of compressed air up the down shaft.

The systems described above also provide no means to aerobically treat effluence such as waste water, sewage effluent or the like.

It would be desirable to provide a more versatile and efficient HAC to compress air for any purpose such as to provide combustion air to a burner or a fuel-fired turbine for the production of steam, work or electricity. It would also be desirable to provide a system incorporating a HAC to provide compressed air according to the foregoing which also uses and aerobically treats waste water such as sewage effluent or the like.

Regarding treatment of waste, it has been known in the prior art to treat effluent such as domestic and industrial waste through aeration to reduce the biologic oxygen demand (BOD) imposed by biodegradation of the waste on the environment. For treatment of sewage it has been known to provide large surface area sludge ponds, aerators, sprinklers and bubblers to supply the BOD for biodegradation of the waste. It has also been known to provide vertical shaft bioreactors as described in Pollock, U.S. Pat. No. 5,660,724. In vertical shaft bioreactors, the effluent is supplied at the top of a vertical shaft to flow downwardly to the bottom. At the bottom of the vertical shaft, air may be injected. From the bottom a riser returns the effluent for recirculation. Air is injected at the bottom of the riser to not only aerate the effluent but to create an air lift for circulation of the effluent. These systems aerobically treat the effluent but do not provide any byproduct such as compressed air which can be utilized to produce energy or work. Further injection of air at the bottom of the vertical shaft cannot provide for any significant compression thereof.

It would be highly desirable if a system could be devised which could not only aerobically treat and agitate a waste water effluent but which could also produce a byproduct of compressed air which can be utilized to, for example, supply combustion air to a burner or a turbine.

SUMMARY OF THE INVENTION

It is an object of the present invention to provide an improved hydraulic air compressor (HAC) which reduces if not eliminates the likelihood of down shaft blowback, which is adapted to produce larger quantities of compressed air and in which the flow of liquid can be controlled.

It is a further object to provide a system and method for treating water and waste water using a high-rate activated sludge process incorporating a HAC for acting as a bioreactor and for the production of compressed air.

There is, therefore, provided according to the present invention a more versatile and efficient HAC and method for compression of large volumes of air by which air and water flow volumes can be adjusted and a system and method incorporating such a HAC which also is adapted to aerobically treat waste water such as sewage effluent and the like.

Toward this end, a HAC is set forth for compressing air using a liquid head which includes a substantially vertical down shaft having an upper end, a lower end and tapered along its length to accelerate flow of liquid from the upper end to the lower end. Means are provided for introducing a liquid head at the upper end of the down shaft such as by from a free-flowing source of water (river, dam or pump), the liquid flowing downward and accelerating through the shaft to a lower end to compress air carried with the liquid. A separation chamber communicates with the down shaft lower end, the compressed air separating from the liquid in the separation chamber. Means such as a blower are provided for injecting air into the liquid flowing in the down shaft for compression thereof. Preferably a blower or compressor is used to introduce air proximate the down shaft upper end for compression thereof. Still more preferably, a restriction defined as a throat is provided proximate the down shaft upper end at which the air is injected into the flowing liquid for capture thereof.

The compressed air at the separation chamber is delivered to, for example, the compression air inlet of a fuel-fired turbine, burner or for any other purpose. The liquid in the separation chamber is directed upwardly through a return shaft for discharge from the HAC. Preferably a control valve is provided in the return riser for controlling the flow of the liquid returning through the return riser to, in turn, control the volume of air contained within the flowing water and ultimately the separation chamber. By virtue of the control means provided by a control valve or the like, the air and water flow can be controlled to provide versatility to the system.

The HAC, according to the present invention, may be incorporated into any system using any liquid. According to a further embodiment of the present invention, however, the HAC is incorporated into a system and method which not only compresses air for any suitable purpose but also acts to aerobically treat water such as waste water including sewage effluent. According to this feature of the present invention, a source of liquid effluent is provided which may be water and a sludge liquor from a waste water treatment facility. The waste water effluent becomes the HAC influent delivered to the upper end of the down shaft of the HAC. By forcibly introducing air into the liquid, according to the HAC of the present invention, the waste water influent is aerobically treated and agitated as it flows through the HAC for compression of the air providing for bioreaction between the oxygen of the supplied air and oxygen requiring microbes in the effluent. The treated water is returned from the separation chamber to a waste water holding pond or the like. By introducing greater amounts of air than could naturally be captured by the liquid of HACs which use the nature capture of air, the additional introduction of air aerobically treats the biological waste of the effluent and increases the volume of air compressed by the HAC. Re-circulation of the effluent through the HAC continues to aerobically treat the effluent.

As can be appreciated, a HAC according to the present invention incorporated into a waste water treatment system not only provides for the efficient and versatile compression of air but also acts to aerobically treat effluent such as sewage waste water. The compressed air can be delivered to a fuel-fired turbine the output shaft of which can be used to provide work such as by driving an electric generator for the production of electricity. Thus effluent which would normally have to be separately aerobically treated through bubbling ponds or spray is aerobically treated advantageously in a HAC which produces compressed air for efficient operation of a turbine to produce electricity.

BRIEF DESCRIPTION OF THE DRAWINGS

These and other features and advantages will become appreciated as the same becomes better understood with reference to description, claims and drawings wherein:

FIG. 3A is a side view of the air separator of the system of FIG. 1;

FIG. 3B is a top plan view of the separator of the system of FIG. 1;

DESCRIPTION

Figure 1:
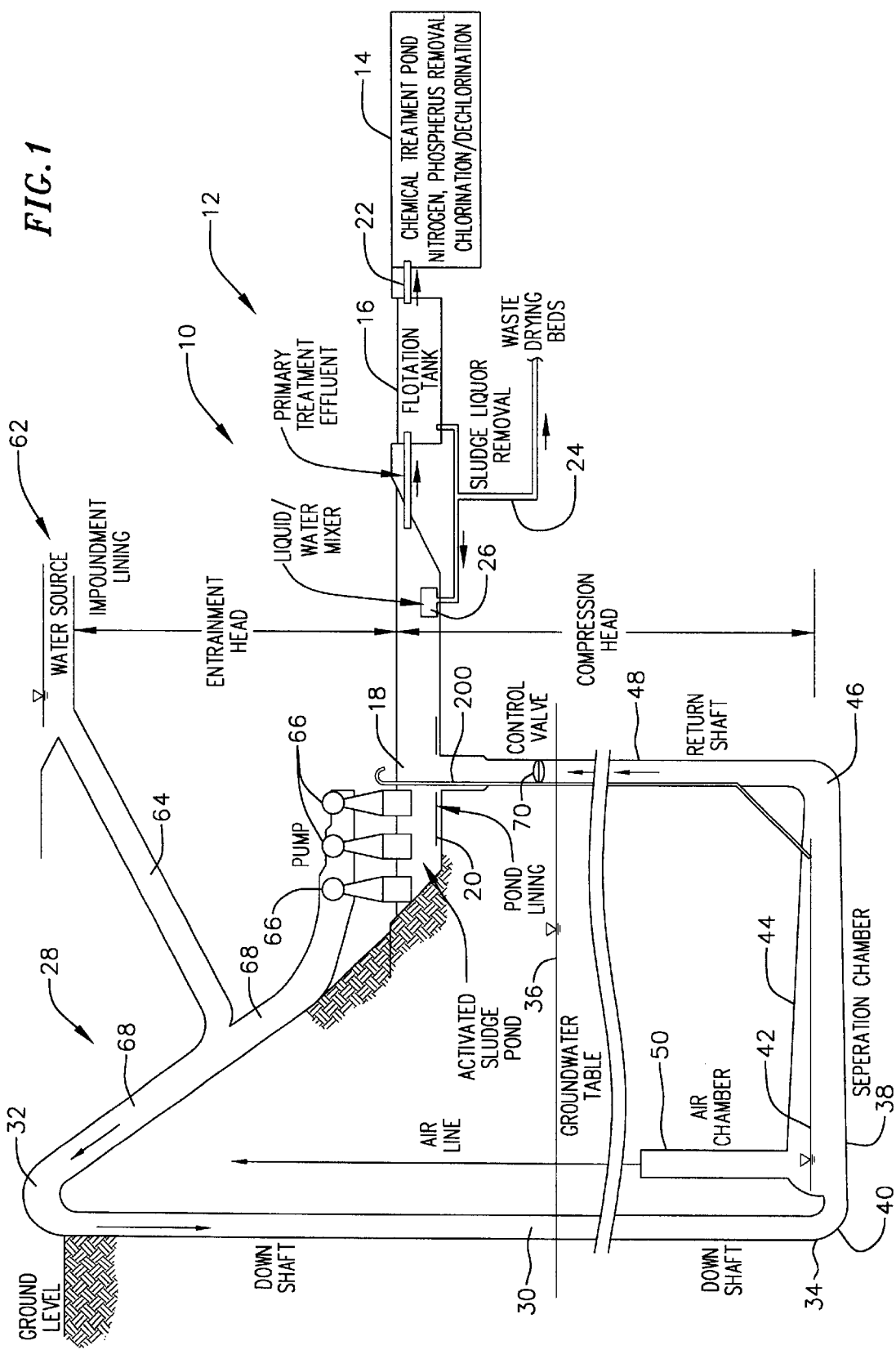
FIG. 1 illustrates a system using a hydraulic air compressor according to the present invention.

Turning to FIG. 1 a system 10 according to the present invention is shown. The system 10 includes a source of liquid shown as a waste water post-treatment facility 12 which may be of conventional construction. The post-treatment facility 12 includes a chemical treatment pond 14 which may include nitrogen and phosphorous removal as well as chlorination or dechlorination. A flotation tank 16 which may be of conventional construction receives treated waste water from the hydraulic air compressor (HAC) as hereinafter described. The floatation tank 16 communicates with an activated sludge pond 18 which is generally open and includes a pond lining 20 to isolate the activated sludge contained in pond 18 from the environment. Primary effluent at the post-treatment facility 12 enters the floatation tank 16 from the sludge pond 18 where buoyant materials float to the surface and are removed, the liquid is directed to the chemical treatment pond 14 for final treatment before released to the environment. Sludge which settles at the bottom or rises to the top of the floatation tank 16 is removed by a line 22 a portion of which is directed by line 24 to waste drying beds and a portion is mixed with water at a mixer 26 and returned to the activated sludge pond 18.

The effluent contained in the activated sludge pond 18 is liquid and, according to the prior art is circulated and aerated by spraying, by bubbling or the like, for aerobic biological treatment of the sludge.

The system 10 according the present invention also includes a hydraulic air compressor or HAC 28 including a substantially vertical down shaft 30 having an upper end 32 and a lower end 34. The down shaft 30 may be embodied as a pipe extending into the ground to place its lower end 34 below the groundwater table 36 as shown in FIG. 1. The down shaft 30 is tapered, decreasing in diameter at least in a portion along its length from the upper end 32 to the lower end 34 to accelerate the flow of liquid there through and resist the formation of slug flow and blowback of compressed air produced in the manner described below. At the lower end 34, the down shaft 30 is communication with a separation chamber 38 as shown in FIGS. 3A and 3B. The separation chamber 38 preferably extends horizontally from the down shaft 30 and may include a round, square or elliptical cross sectional configuration. At the lower end 34, the down shaft 30 is coupled to the separation chamber 38 at a first trap 40 adapted to be filled with liquid to maintain a seal between the lower end 34 and air chamber defined within the separation chamber 38 as hereinafter described. Preferably the separation chamber 38 has a larger cross section area than that of the down shaft 30 so that the liquid flowing there through is slowed to provide a period of time for compressed air to be released from the liquid for collection thereof. As shown in FIG. 3A, preferably a water level 42 is maintained within the separation chamber 38 above the first trap 40 to provide the aforementioned seal.

At the upper portion of the separation chamber 38 there is defined an air chamber 44 into which the air compressed by the HAC 28 is collected. The air chamber 44 may extend along the entire length of the separation chamber 38 and, as shown in FIG. 3A, may have a cross section area which is semi-circular and reduces from a location proximate the first trap 40 along the length of the separation chamber 38. Thus, at the entrance to separation chamber 38 where a larger volume of compressed air is released, a greater cross section area is provided than at the opposite end where lesser amounts would be released.

Opposite the first trap 40, the separation chamber 38 has a second trap 46 which, like the first trap 40, is adapted to remain filled with water to seal the air chamber 44 within the separation chamber 38. The second trap 46 is coupled to a return riser 48 extending substantially vertically to return the liquid, as shown in FIG. 1, to the sludge pond 18. Thus it can be appreciated that liquid introduced at the upper end 32 of the down shaft 30 of the HAC 28 flows through the down shaft 30 to collect at and submerge the first trap 40 for compression of air carried with the liquid. The liquid enters the separation chamber 38 whereat compressed air is released from the liquid into the air chamber 44. The liquid flows through the separation chamber 38 to the second trap 46 whereupon it enters the riser 48 for return to the sludge pond 18. As stated above, preferably the separation chamber 38 has a larger cross section than does the down shaft 30 to slow the flow of liquid for release of compressed air.

Compressed air collected in the air chamber 44 is directed by an air line 50 for purposes of which will hereinafter be explained.

To prevent flooding of the separation chamber 38, level sensing means are provided to sense the level of liquid in the separation chamber 38.

As is known, waste water retained in the sludge pond 18 is preferably aerobically treated by aeration. This aeration, according to the prior art, is done with sprinklers, bubblers and large surface areas of sludge ponds 18. The sprinklers, bubblers and large surface area heretofore used is replaced by the apparatus of the present invention. Aeration is attained by operation of the HAC.

Figure 2:
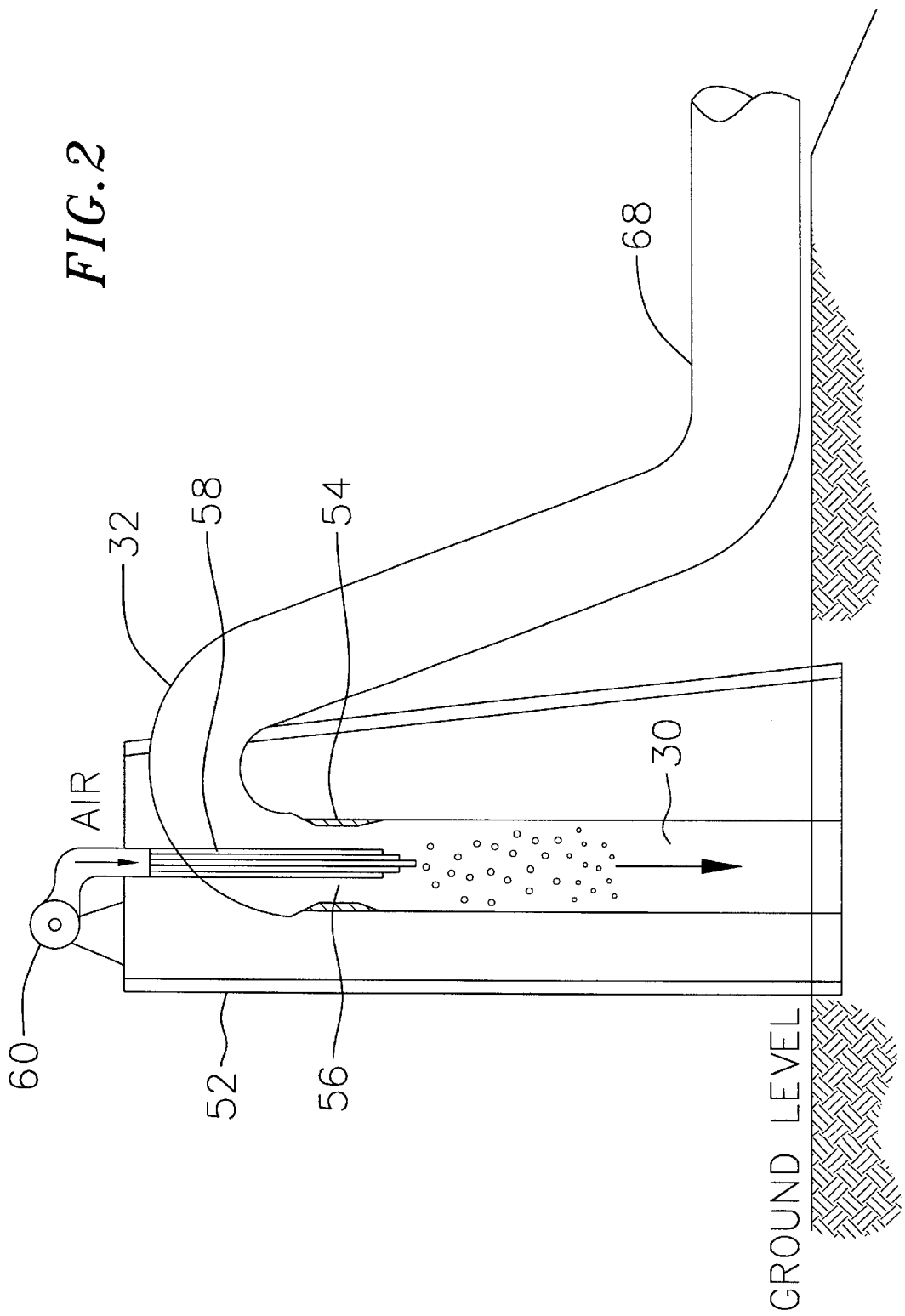
FIG. 2 illustrates a portion of the system of FIG. 1 showing the injection of air for compression thereof by the hydraulic air compressor.

With reference to FIG. 2, to increase the efficiency of the HAC 28 and for aerobic treatment of the liquid circulating through the HAC 28, means are provided for forcibly introducing air into the liquid preferably proximate the upper end 32. These means introduce air at a positive pressure (a pressure above atmospheric pressure) to not only aerate the liquid and act as a biological reactor therefor, but also to increase the volume of air to be compressed by the HAC 28.

Accordingly, at the upper end 32 of the down shaft 30, there is provided a support structure 52 through which extends the down shaft 30 into the ground. Proximate the upper end 32 there is provided a restriction 54 defining a narrow throat 56 adapted to increase the velocity (and reduce the pressure) of the liquid entering the upper end 32 of the down shaft 30. Proximate the exit of the throat 56 and at a location proximate the location where the liquid is at an elevated velocity, there is disposed one or more injectors 58 for injecting air into the liquid. The injectors 58 may be embodied as a single pipe extending axially into the down shaft 30 or may be embodied as a bundle of pipes disposed axially in the down shaft 30 to introduce smaller diameter streams of air injected into the liquid. The injectors 58 communicate with a blower 60 which is adapted to deliver air through the injectors 58 into the liquid. By adjusting the volume air delivered by the blower 60, the volume of air introduced into the liquid entering the HAC 28 can likewise be adjusted. As can be appreciated, greater amounts of air can be introduced to the liquid as it enters the HAC 28 than could be naturally entrained or drawn in by a simple venturi arrangement or like arrangement. Furthermore, by providing the blower 60, a control can be provided on the amount of air injected into the liquid. It should further be understood that the air injected into the liquid acts to aerobically treat the liquid which is mixed as it flows down the down shaft 30 to the separation chamber 30.

With reference to FIG. 1, the system 10 includes means for supplying liquid to the HAC 28 for compression of air. These means may be from a water source 62 such as a lake, dam or river introduced into the HAC 28 through a water supply line 64 and/or delivered by pumps 66 delivering liquid from the sludge pond 18. The pumps 66 have a discharge line 68 which is in communication with the upper end 32 of the HAC 28. Thus an elevated source 62 or pumps 66 may be used to supply water or waste water or a combination thereof to the HAC 28. The liquid is delivered to the upper end 32 of the down shaft 30 whereupon it flows due to gravity to compress the air entrained and carried by the liquid, the compressed air and liquid delivered to the separation chamber 38 for separation of the air from the liquid.

To control the flow of the air contained within the air chamber 44, the HAC 28 includes means to control the flow of liquid through the separation chamber 38. As is known, the vertical column of liquid flowing up the riser 48 exerts a pressure head at the separation chamber 38. Preferably the control means of the present invention includes a control valve 70 disposed in the riser 48 which can be adjusted to control the flow of liquid flowing upwardly through the riser 48. Thus, it can be understood, that by altering either or both the rate of supply of liquid to the down shaft 30 or the restriction provided by the control valve 70, the air and water flow in the air chamber 44 can be adjusted. Further by adjusting the amount of air delivered by the blower 60, the volume of air compressed by the HAC can further be adjusted. It is to be understood that the control valve 70 will operate between selected parameters so as not to back up the flow in the down shaft 30 and/or flood the separation chamber 38. Thus the control valve 70 can be used to tune the system 10 in conjunction with the rate at which liquid is supplied to the HAC 28 and the rate at which air is delivered by the blower 60.

The liquid returning through the riser 48 is discharged back into the sludge pond 18. As can be appreciated, the liquid at the sludge pond 18 is circulated through the HAC 28 for aerobic treatment and mixing. Thus the system 10 accomplished several desired ends. First, it provides a means to aerobically treat waste water such as sludge by forcibly introducing air into the liquid and acting as a bioreactor therefor. Second, it enhances oxygenation by the mixing action as it flows through the system. Further it creates a source of compressed air.

As further can be appreciated, the volume of air compressed by the HAC 28 can further be adjusted by increasing the volume of air injected by the blower 60 through the injectors 58 into the liquid. Thus it is to be understood, that the HAC 28 of the system 10 can have varied outputs based on flow volumes and depending upon the adjustment of the control valve 70 and blower 60. Thus the HAC 28 can be adjusted to optimize the desired output.

To prevent over pressurization of the separation chamber 38 and loss of the seals provided by the first and second traps 40, 46, a relief tube 200 extends from an end submerged in the separation chamber 38 to vent for example above ground, in the event that pressure builds in the separation chamber 38 to such a level as to lower the water level 42 so as to approach the loss of the seals at the first and second traps 40, 46, the end of the tube 200 would be exposed and the compressed air in the separation chamber 38 would vent reducing pressure and returning the water level so as to maintain the seals.

In the event the level sensing means sense a rise in the liquid level in the separation chamber, the air line 50 may be closed or the flow of compressed air restricted to build pressure in the air chamber 38 to lower the liquid level.

Figure 4:
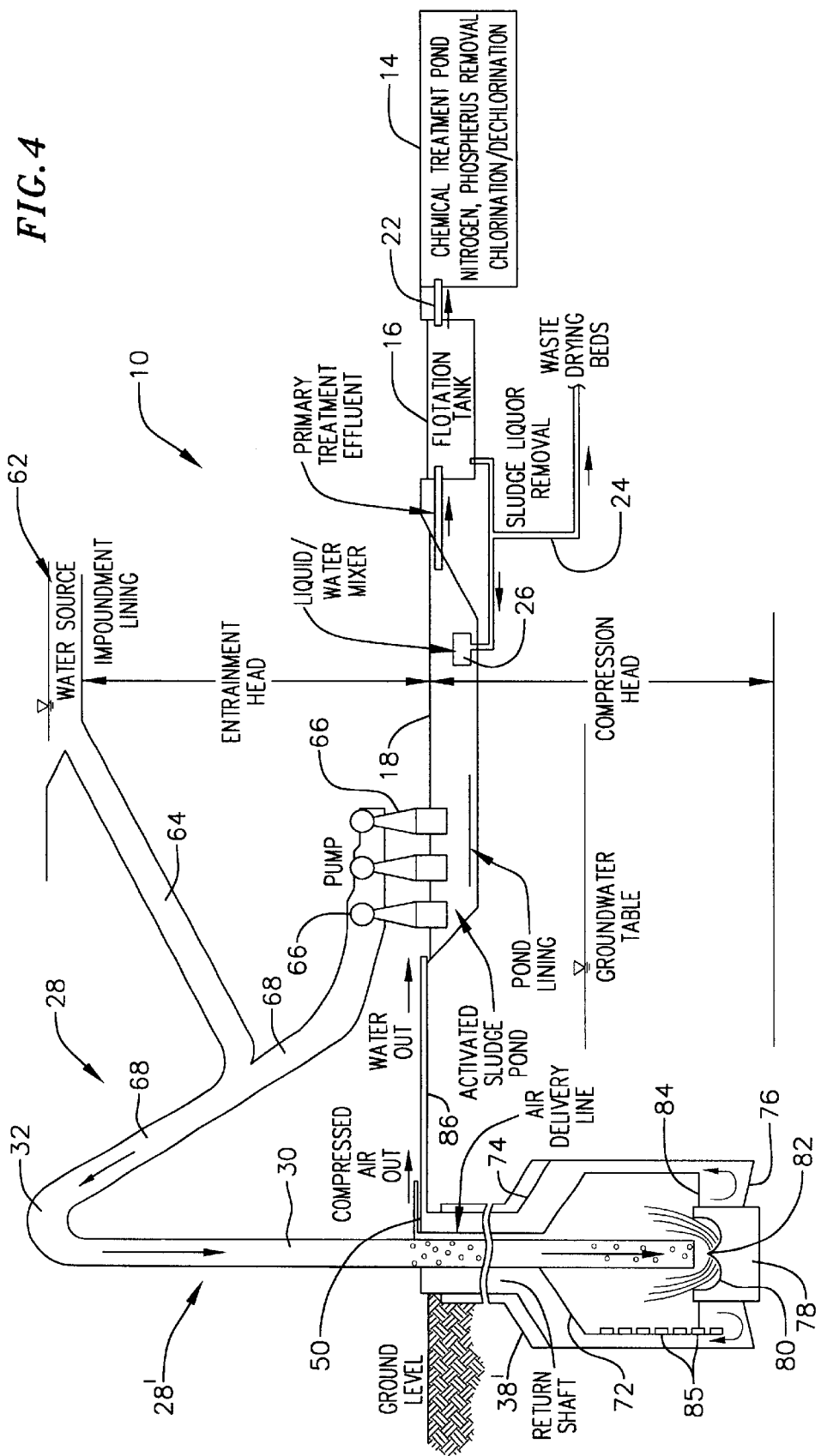
FIG. 4 illustrates a system according to the present invention employing a further embodiment of the hydraulic air compressor according to the present invention.

Turning to FIG. 4, an alternate embodiment of the invention is shown. Like components bear like reference numerals.

The system 10 of FIG. 4 includes a modified HAC 28' which does not include a horizontally or substantially horizontally disposed separation chamber 38. According to this embodiment, the down shaft 30 extends into a separation chamber 38' which includes an inner bell 72 and an outer bell 74. The outer bell 74 is closed having a bottom 76 including an impingement block 78 defining an impingement surface 80 against which the liquid flowing through the down shaft 30 impinges as it falls from the open lower end 34 of the down shaft 30. The infringement surface 80 is generally cup-shaped having a central cone 82 to angularly deflect the flowing liquid into the impingement surface 80. Upon engaging the impingement surface 80 the liquid flowing from the down shaft 30 releases and breaks up the compressed air bubbles carried therewith into the inner bell 72 for collection thereof. As shown in FIG. 4, the bottom of the inner bell 72 is open and remains submerged below the water level 84 maintained within the outer bell 74. Level sensors 85 in the inner bell 72 sense the level of liquid to maintain the inner bell 72 submerged and to prevent flooding of the inner bell 72. The liquid discharged into the inner bell 72 collects and circulates from the inner bell 72 into the outer bell 74 whereupon it is carried upwardly through the outer bell 74 to an outlet 86 for return to the sludge pond 18. Compressed air collected in the inner bell 72 is removed by an air line 50 from the inner bell 72.

As can be appreciated the system 10 according to FIG. 4 may also include the restriction 54, blower 60 and injectors 58 as described above to increase the volume of air compressed by the HAC 28. By controlling the air flow to the inner bell 72 and volume of air introduced by the blower 60, the HAC 28 can be balanced to produce a desired air and water volume within the limits defined by the physical constraints of the construction of the HAC 28.

Preferably the impingement block 78 or at least the surface 80 thereof is made of a wear resistant material such as steel, concrete or the like to resist wear induced by the impinging liquid.

Figure 5:
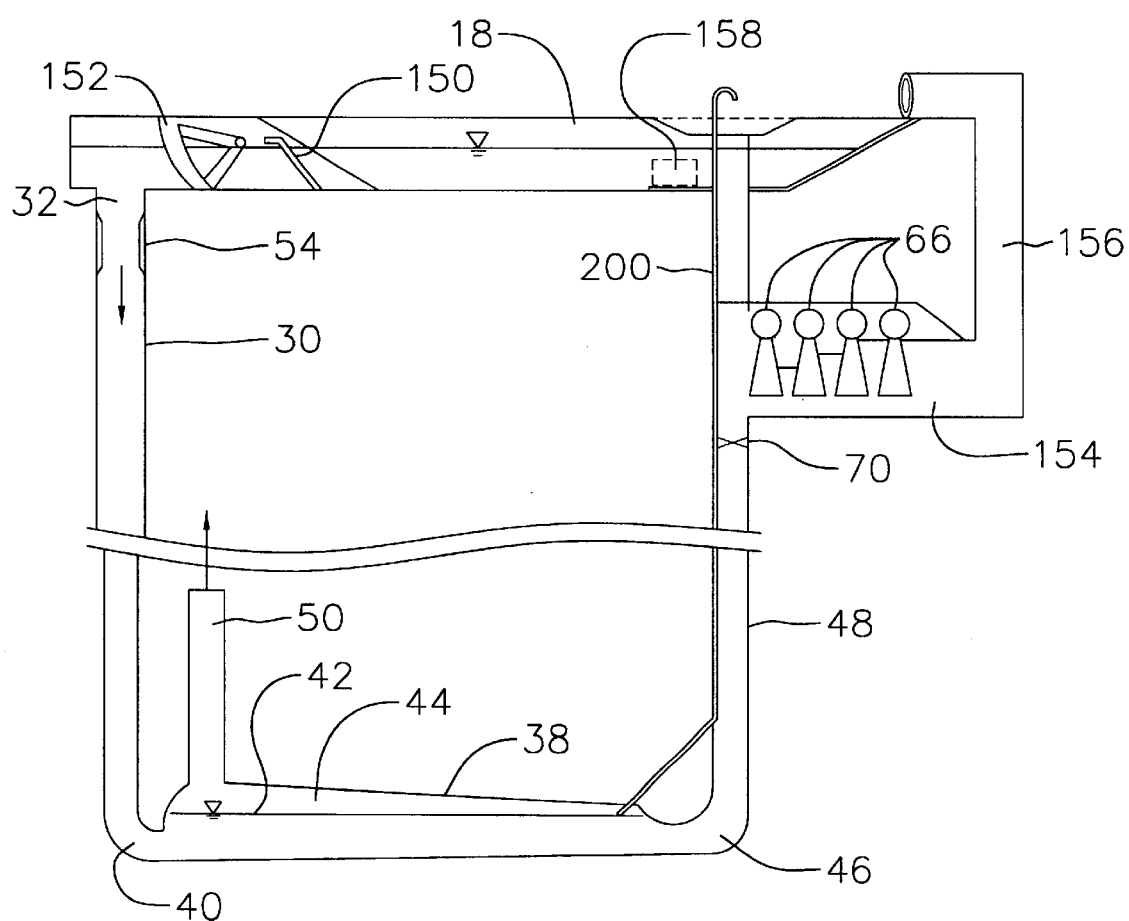
FIG. 5 illustrates a system according to the present invention employing a alternate embodiment of the hydraulic air compressor according to the present invention.

Turning to FIG. 5 a further embodiment of the invention is shown. Like components bear like reference numerals. The upper end 32 of the down shaft 30 terminates and is open to the sludge pond 18. A screen 150 may be provided in the sludge pond 18 to screen large materials from entering the upper end and an inlet gate 152 may be provided to terminate the flow from the pond 18 into the upper end 32. Liquid from the sludge pond 18 enters the upper end and falls, in the manner described above with reference to FIG. 1 to the first trap 40 and separation chamber 38. From the separation chamber 38 the liquid flows up the riser 48 through the control valve 70 and into a subterranean pumping chamber 154 located at an elevation below the upper end 32 of the down shaft 30 equal to the desired head for the HAC 28. The pumps 66 are located in the pumping chamber 154 pump the liquid through a pipe 156 to return to the sludge pond 18.

The return water flow in the riser 48 flows into the horizontally disposed pumping chamber 154 where it is sucked into the pumps 66 and pumped back to the sludge pond 18. The control value 70 is located below the pumping chamber 154.

A liquor/water mixer 158 may be provided in the sludge pond 18 to dilute the liquor in the sludge pond 18.

The embodiment of FIG. 5 is adapted to reduce above ground structures which may not be considered aesthetically pleasing.

As can be appreciated the HAC 28 according to FIG. 5 may also include the restriction 54, blower 60 and injectors 58 as described above to increase the volume of air compressed by the HAC 28.

Figure 6:
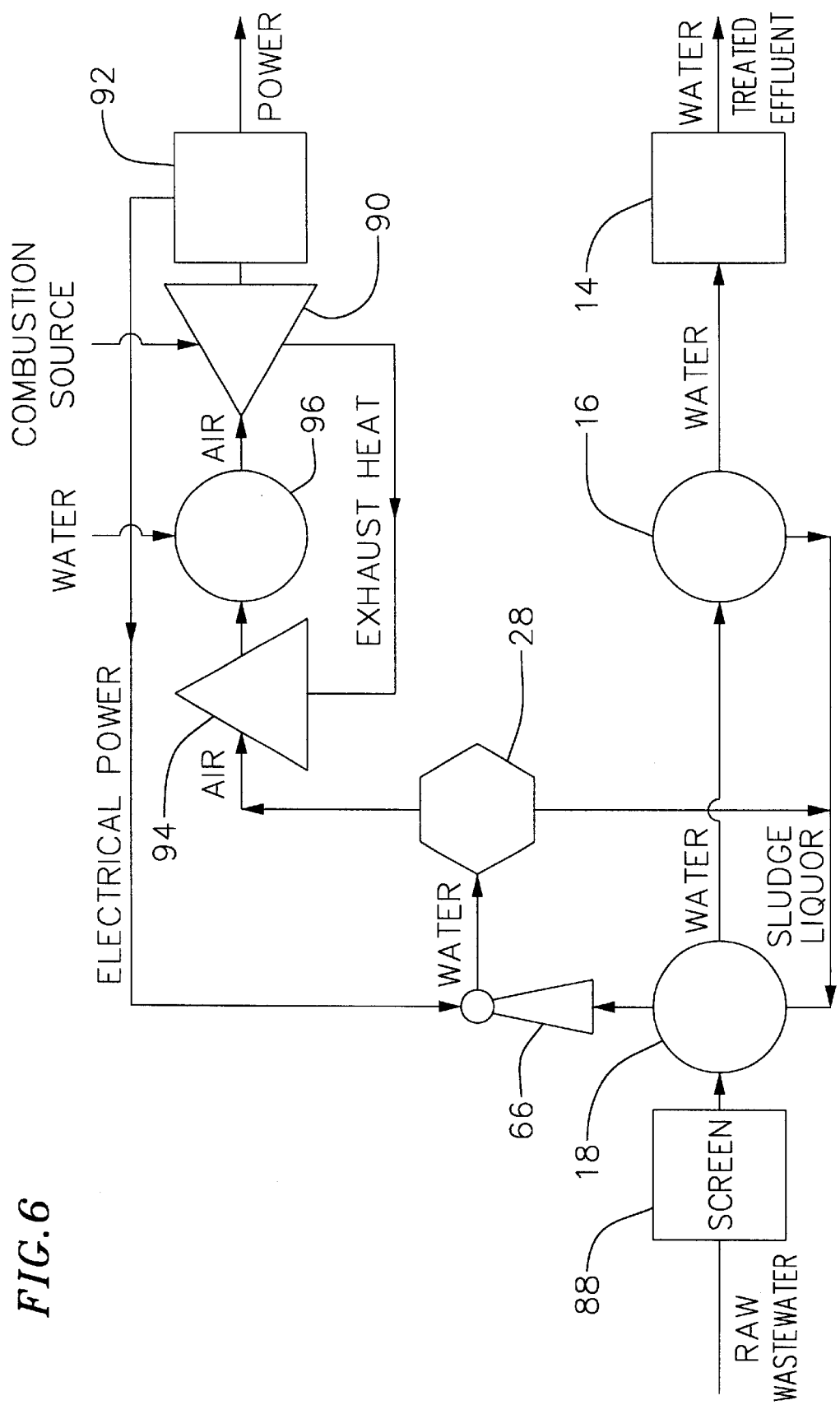
FIG. 6 illustrates an open system according to the present invention.
Figure 7:
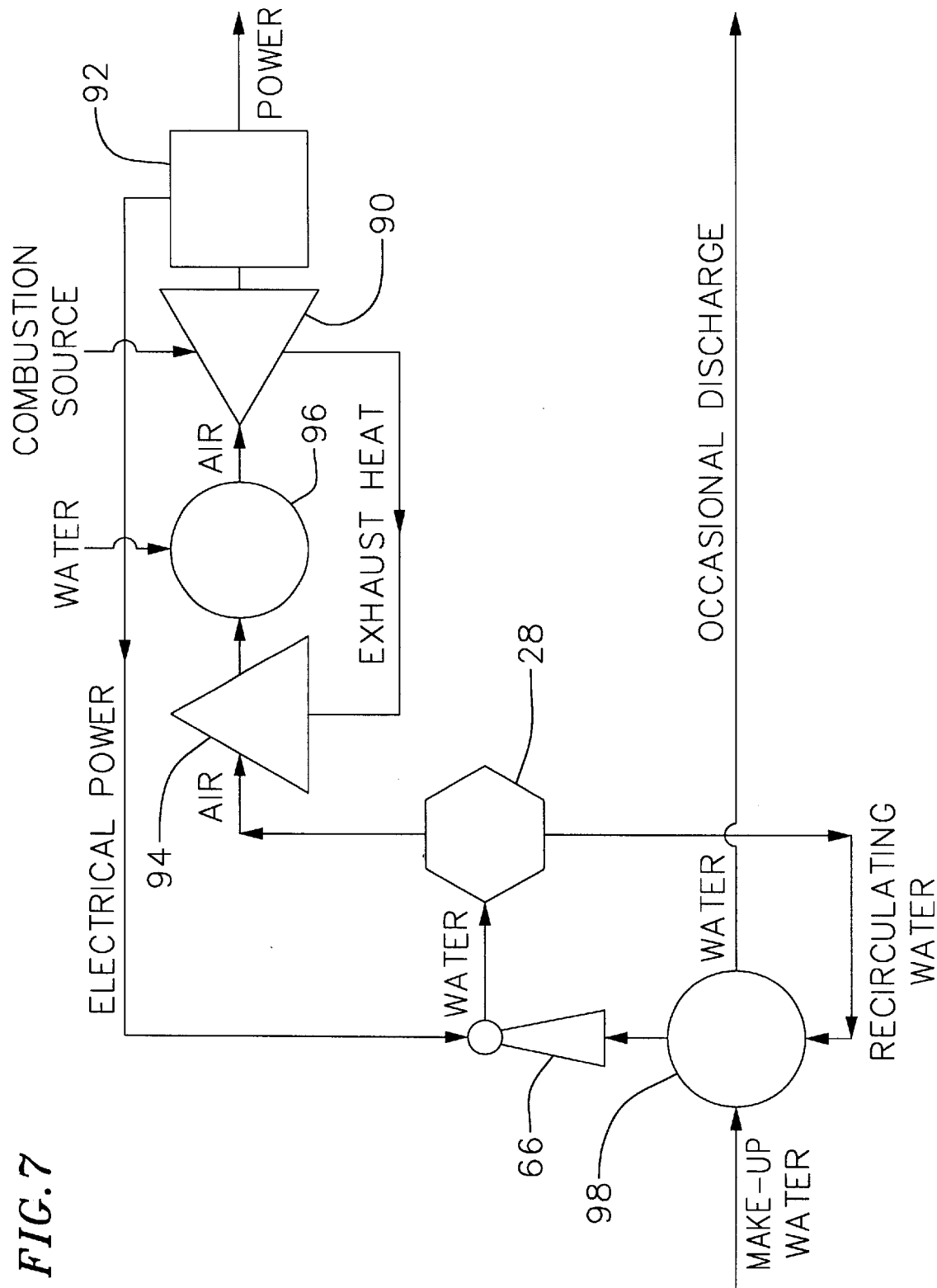
FIG. 7 illustrates a closed system and method according to the present invention.
Figure 8:
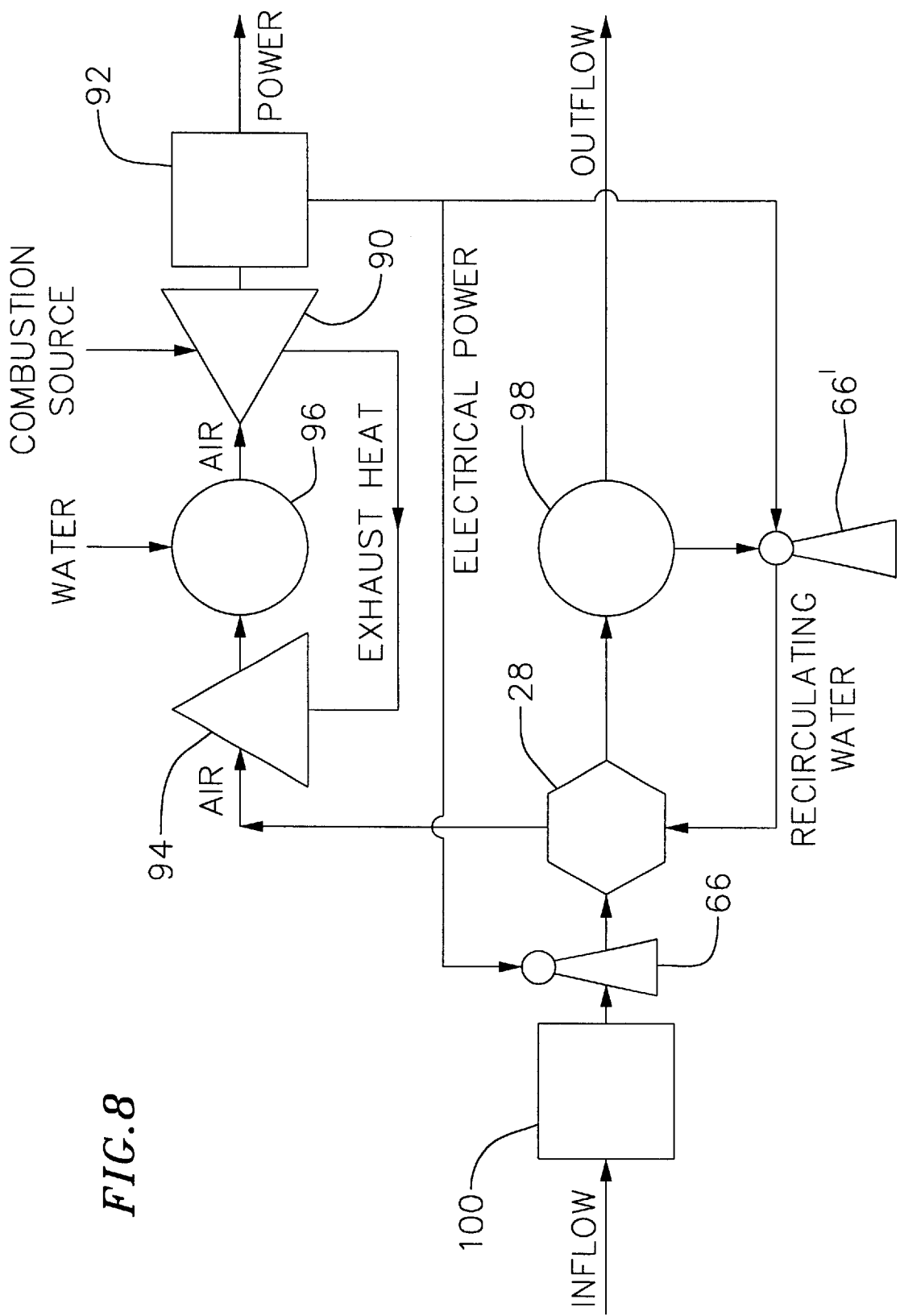
FIG. 8 illustrates a further embodiment of the system and method according to the present invention.

Turning to FIGS. 6 through 8, the operation of the system 10 to produce electricity is shown. With reference to FIG. 6, the waste water effluent is passed through a screen 88 to screen particulate matter before the effluent is discharged into the sludge pond 18. From the sludge pond 18 the liquid effluent is pumped by pumps 66 into the HAC 28 to produce compressed air. The compressed air is removed from the HAC 28, and more particularly the separation chamber 38, and is delivered to means for producing work, be it power, combustion or the like. As shown in FIG. 6, these means may include a fueled gas turbine 90 coupled to an electrical generator 92 for the production of electricity. While the compressed air from the HAC 28 may be delivered directly to the burners for the turbine 90, as shown in FIG. 5 the compressed air may be preconditioned. Accordingly, a heat exchanger or recuperator 94 and humidifier 96 may be provided. Exhaust heat from the turbine 90 is passed through the recuperator 94 to preheat the air prior delivery to the turbine 90.

The humidifier 96 humidifies the heated air to increase its density for more efficient operation of the turbine 90. In that the compressed air from the HAC 28 is dry air, humidifying the air may be desirable. The use of the this air for electrical generation is significantly improved with the addition of a humidifier 96.

With continued reference to FIG. 6, the liquid circulated through the HAC 28 is returned to the sludge pond 18 for recirculation and treatment as described above. Water from the sludge pond 18 is also delivered to the floatation tank 16 and from there to the chemical treatment pond 14 for ultimate discharge of treated effluent as described above.

Thus it can be appreciated, that when the system 10 is included in an overall system including means for generating power, the recirculation of the liquid not only provides for biological reaction of the effluent through aerobic treatment but also provides compressed, combustion air to a turbine 90 operating a generator 92 for the production of electrical power.

Turning to FIG. 7, a modified system is shown which uses a closed loop recirculation system for driving the HAC 28. According to the embodiment of FIG. 6, a recirculation pond or sludge pond 18 is provided to store liquid such as water for operating the HAC 28. The liquid is pumped by pumps 66 to the HAC 28 for generation of electrical power as described above with reference to FIG. 6. From the HAC 28 the water is continuously recirculated to the sludge pond 18. If desired, like the embodiment in FIG. 6, the electrical power generated by the generator 92 may be used to power the pumps 66.

With reference to FIG. 8, a combined open and closed system is shown. Like components carry like reference numerals. Liquid is brought into an impoundment structure 100 to act as a reservoir for supply of liquid by pumps 66 to the HAC 28. The compressed air generated by the HAC 28 is supplied to the turbine 90 for generation of electrical power in the manner described above. Again the electrical power created by the generator 92 may be used to power the pumps 66. The liquid discharged from the HAC 28 is directed to a recirculation or sludge pond 18 providing a source of water to be pumped by pumps 66' likewise to the HAC 28.

Thus liquid is supplied to the HAC 28 from either or both the impoundment structure 100 (such as a water supply like a dam) and a recirculation or sludge pond 18.

As further can be appreciated, the HAC 28 may be, with reference to FIG. 1, driven directly from a water source 62 such as a dam or river, with the water returned by the HAC 28 discharged below the dam or the like. Thus the HAC 28 according to the present invention need not only be used in a system including biological reaction as described with reference to FIG. 1.

While I have shown and described certain embodiments of the present invention, it is to be understood that it is subject to many modifications and changes not departing from the spirit and scope of the appended claims.

I claim:

1. A system for aerobically treating and agitating effluent to reduce the biological oxygen demand (BOD) thereof and for producing compressed air comprising:
   a reservoir containing effluent;
   a hydraulic air compressor defining a bio-reactor having,
      (i) a substantially vertical down shaft having an upper and a lower end,
      (ii) a separation chamber communicating with the down shaft lower end,
      (iii) a first conduit for removing the effluent from the separation chamber and a second conduit for removing compressed air from the separation chamber, said first conduit defined by a vertical riser, said effluent in said riser imposing a head pressure on the effluent in the separation chamber;
   at least one pump to pump effluent from said reservoir and to circulate effluent discharged from said bio-reactor to the shaft upper end, said effluent falling through said down shaft to compress air and for agitation thereof, said compressed air separated from said effluent in said separation chamber and said effluent passing from said separation chamber through said first conduit for re-circulation and aerobic treatment thereof and discharge to said reservoir; and
   a conduit for conducting compressed air from said separation chamber.

2. The system of claim 1 including said pump disposed to have its suction in communication with the first conduit.

3. The system of claim 1 including means for controlling the re-circulation flow of the effluent.

4. The system of claim 3 wherein said controlling means including a flow control valve disposed in said vertical riser.

5. The system of claim 3 including a level sensor to sense the level of effluent in said separation chamber.

6. The system of claim 5 including means for controlling the circulation of effluent through said separation chamber, said level sensor in communication with said circulation control means to control the level of effluent maintained in said separation chamber.

7. The system of claim 1 including a restriction in said down shaft proximate said upper end defining a Venturi having a throat, air injectors disposed proximate said throat and a blower to supply pressurized air through said injectors into the effluent.

8. The system of claim 1 including a demister to remove moisture for the compressed air.

9. The system of claim 1 further including a fuel-fired burner, said compressed air conduit coupled to said burner for directing said compressed air thereto as combustion air.

10. A substantially closed system for treating liquid effluent by reducing the BOD of the effluent comprising:
    a sludge pond to retain effluent;
    a flotation tank to separate solids from the effluent;
    a chemical treatment module for chemically treating effluent;
    a hydraulic air compressor defining a bio-reactor having,
      (i) a substantially vertical down shaft having an upper and a lower end,
      (ii) a separation chamber communicating with the down shaft lower end,
      (iii) a first conduit for removing the effluent from the separation chamber and a second conduit for removing compressed air from the separation chamber, said first conduit defined by a vertical riser, said effluent in said riser imposing a head pressure in the effluent in the separation chamber;
    at least one pump in communication with said reservoir and first conduit to pump effluent from the reservoir to said bio-reactor and effluent discharged from said bio-reactor to the down shaft upper end for circulation of the effluent though the compressor for agitation thereof, said effluent falling down the down shaft for compression of air, said compressed air separated at said separation chamber and said effluent discharged from said separation chamber into said first conduit and returned to said pond;
    means for injecting air proximate said down shaft upper end for entrainment in said effluent and for compression thereof and for aerobic treatment of said effluent;
    a second conduit for directing the compressed air from said separation chamber; and
    means for discharging from said sludge pond to said flotation tank and from said flotation tank to said chemical treatment module effluent for discharge from said system.

11. The system of claim 10 including means for controlling the circulation of effluent through said bio-reactor.

12. A method for aerobically treating effluent and for generating compressed air comprising:
    providing a hydraulic air compressor defining a bio-reactor having a down shaft to conduct falling effluent to a separation chamber for separation of compressed air from the effluent, a vertical riser to conduct effluent from the separation chamber and a compressed air conduit for removing compressed air from the separation chamber;
    pumping effluent from said first conduit and from a source thereof for circulation through the bio-reactor including supplying the effluent from the source to the down shaft and returning the effluent from the separation chamber to the source for re-circulation thereof, said effluent aerobically treated by passing through said bio-reactor;
    treating the re-circulated effluent for discharge into the environment; and
    removing the compressed air from the separation chamber.

13. The method of claim 12 including supplying said compressed air as combustion air to a combustion engine driving an electrical generator to produce electrical power.

14. A method for aerobically treating waste liquid and for supplying combustion air to a power generating unit comprising:
    separating solids from the waste liquid to define a waste liquid;
    providing a hydraulic air compressor defining a bio-reactor including,
      (i) a substantially vertical down shaft having an upper and a lower end,
      (ii) a separation chamber communicating with the down shaft lower end,
      (iii) a first conduit for removing the liquid from the separation chamber and a second conduit for removing compressed air from the separation chamber, said first conduit defined by a vertical riser, said liquid in said riser imposing a head pressure in the liquor in the separation chamber, and (iv) means for controlling the head pressure imposed by the liquid in the riser;

supplying the liquor at the shaft upper end, said liquid falling through the down shaft to compress air, entering the separation chamber for separation of compressed air from the liquid and discharged from the separation chamber up through the riser;

injecting air into the liquor at the down shaft upper end proximate for aerobic treatment of the liquid;

controlling the head pressure and flow of liquor to the shaft upper end to control the pressure of the compressed air generated and the rate of flow through the bio-reactor; and supplying the compressed air collected at the separation chamber through the second conduit as combustion air to the burner for a power generation unit.

* * * * *